US010248093B2

(12) United States Patent
Pietrusinski

(10) Patent No.: US 10,248,093 B2
(45) Date of Patent: Apr. 2, 2019

(54) COMPLIANT FORCE CONTROL MODULE

(71) Applicant: AndrosRobotics, LLC, Cambridge, MA (US)

(72) Inventor: Maciej Pietrusinski, Cambridge, MA (US)

(73) Assignee: ANDROSROBOTICS, LLC, Cambridge, MA (US)

( * ) Notice: Subject to any disclaimer, the term of this patent is extended or adjusted under 35 U.S.C. 154(b) by 0 days.

(21) Appl. No.: 15/372,060

(22) Filed: Dec. 7, 2016

(65) Prior Publication Data

US 2017/0160713 A1 Jun. 8, 2017

Related U.S. Application Data

(60) Provisional application No. 62/263,946, filed on Dec. 7, 2015.

(51) Int. Cl.
| | |
|---|---|
| *G05B 19/042* | (2006.01) |
| *H02K 7/14* | (2006.01) |
| *H02K 7/06* | (2006.01) |
| *B25J 13/08* | (2006.01) |
| *A61G 5/14* | (2006.01) |

(52) U.S. Cl.
CPC .......... *G05B 19/042* (2013.01); *B25J 13/085* (2013.01); *H02K 7/06* (2013.01); *H02K 7/14* (2013.01); *A61G 5/14* (2013.01); *G05B 2219/39319* (2013.01)

(58) Field of Classification Search
CPC ........ G05B 19/291; G05D 3/127; H03M 1/00
USPC ........................................ 318/602, 569, 600
See application file for complete search history.

(56) References Cited

U.S. PATENT DOCUMENTS

| | | | | |
|---|---|---|---|---|
| 4,862,751 A | * | 9/1989 | Asakawa | G01L 1/044 73/862.044 |
| 6,499,336 B1 | * | 12/2002 | Raffer | G01N 11/14 73/54.23 |
| 8,092,402 B2 | * | 1/2012 | Iwaki | A61H 1/0237 601/35 |
| 8,499,619 B2 | * | 8/2013 | Raffer | G01N 11/14 73/54.28 |

(Continued)

OTHER PUBLICATIONS

Pratt, G., et al., "Stiffness Isn't Everything," Preprints of the Fourth International Symposium on Experimental Robotics, ISER '95, 6 pages (Jun. 30-Jul. 2, 1995).

(Continued)

*Primary Examiner* — Rina I Duda
(74) *Attorney, Agent, or Firm* — Foley & Lardner LLP

(57) ABSTRACT

A system includes a first plate and a second plate disposed in parallel, and guides disposed between the first and second plates, including a first guide cantilevered from the first plate and a second guide cantilevered from the second plate. The first guide is offset from the second guide, and a plurality of bearings include a first bearing disposed at a distal end of the first guide, and a second bearing disposed at a distal end of the second guide. The first guide is arranged to mate with the second bearing, and the second guide is arranged to mate with the first bearing. The system further includes elastic members, including a first elastic member between the first plate and the second plate and provided concentrically around the first guide to extend in an axial direction along the first guide.

12 Claims, 14 Drawing Sheets

(56) References Cited

U.S. PATENT DOCUMENTS

2014/0213951 A1* 7/2014 Pietrusisnki .......... A61H 1/024
602/23

OTHER PUBLICATIONS

Hogan, Neville, "Stable Execution of Contact Tasks Using Impedance Control," IEEE, pp. 1047-1054 (Mar. 1987).
Williamson, M., "Transition of Robot Technologies from Academia to Industry," © Heartland Robotics Inc., 21 pages (Jun. 14, 2011).

* cited by examiner

COMPLIANT FORCE CONTROL MODULE

CROSS-REFERENCE TO RELATED APPLICATIONS

This application claims the benefit of priority to U.S. Provisional Patent Application Ser. No. 62/263,946, entitled "COMPLIANT FORCE CONTROL MODULE," filed on Dec. 7, 2015, the disclosure of which is incorporated herein by reference in its entirety for all purposes.

TECHNICAL FIELD

The present disclosure relates generally to force control systems, methods, and components. More particularly, the disclosure relates to improved force-controlled systems including backdrivable actuators, and corresponding methods and components thereof. Particular embodiments described herein may be applied in robotic systems.

BACKGROUND

Backdrivable actuators are used in the service robot market, for example, in rehabilitation robotics, co-robot implementations, and flight simulators, among other applications. However, existing backdrivable actuators capable of delivering substantial amounts of force are extremely expensive. Such systems often require complicated hardware and software components, and a relatively large number of unique components.

SUMMARY

According to an aspect of the present disclosure, a system comprises a plurality of plates, a first plate of the plurality of plates and a second plate of the plurality plates being disposed in parallel; a plurality of guides disposed between the first plate and the second plate, including a first guide cantilevered from the first plate and a second guide cantilevered from the second plate, the first guide being offset in a vertical direction from the second guide; a plurality of bearings including a first bearing disposed at a distal end of the first guide, and a second bearing disposed at a distal end of the second guide; the first guide being arranged to mate with the second bearing, and the second guide being arranged to mate with the first bearing; and a plurality of elastic members, including at least a first elastic member disposed between the first plate and the second plate, the first elastic member being provided concentrically around the first guide and extending in an axial direction along the first guide.

According to another aspect of the present disclosure, a system comprises a plurality of plates disposed in parallel; a force sensor configured to measure at least a first force acting on a first plate of the plurality of plates and a second force acting on a second plate of the plurality of plates; a driver for a brushless motor driving an actuator communicated with the first plate and the second plate; and a microcontroller programmed to execute a closed loop torque control of the driver responsive to feedback from the force sensor.

According to yet another aspect of the present disclosure, a method comprises disposing a plurality of plates in parallel, including a first plate and a second plate; attaching a first guide to the first plate to be cantilevered from the first plate; attaching a second guide to the second plate to be cantilevered from the second plate; disposing a first bearing at a distal end of the first guide, and a second bearing at a distal end of the second guide; engaging the first guide with the second bearing and the second guide with the first bearing; measuring, by a sensor, a change in distance between the first plate and the second plate; and providing feedback to a controller in response to the change in distance measured by the sensor. The feedback provided is spring deflection, which is sent to a controller (e.g., a microcontroller having hardware components as discussed below, among other things). The deflection signal is used to compute force experienced by the spring assembly in accordance with Hooke's law ($F=kx$, where the spring stiffness is known).

Some or all of the systems, components and subcomponents of the present invention can include custom-machined components or commercially available components, and any combination thereof. Some or all of the systems, components and subcomponents of the present invention can be made of a unitary construction (formed from a single piece of metal or material) or unitary modular construction (e.g., a plurality of components and/or subcomponents permanently connected via welding or soldering), or of modular construction (e.g., a plurality of components and/or subcomponents removably connected by standard techniques, such as threading or bolting).

These and other features of various embodiments can be understood from a review of the following detailed description in conjunction with the accompanying drawings.

It is to be understood that both the foregoing general description and the following detailed description are exemplary and explanatory and are not restrictive of the present invention, as claimed.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing.

DETAILED DESCRIPTION

Figure 1A:
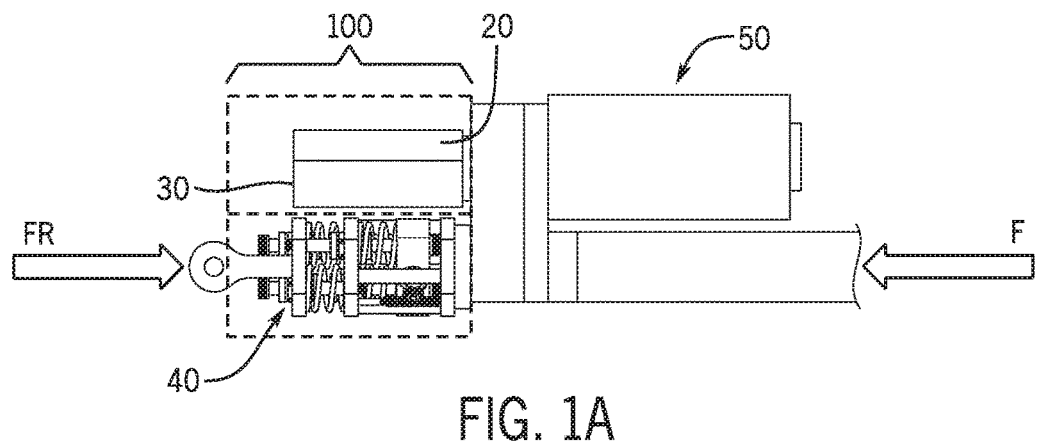
FIG. 1A is a side view of a system according to an embodiment.

The following detailed description and the appended drawings describe and illustrate various exemplary systems, methods, and components. The description and drawings are exemplary in nature and are provided to enable one skilled in the art to make and use one or more exemplary systems and/or components, and/or practice one or more exemplary methods. They are not intended to limit the scope of the claims in any manner.

Where technical features in the drawings or detailed description are followed by reference signs, the reference signs have been included to increase the intelligibility of the drawings, detailed description, and claims. Accordingly, neither the reference signs nor their absence have any limiting effect on the scope of any claim elements.

The use of "e.g.," "etc.," "for instance," "in example," and "or" and grammatically related terms indicates non-exclusive variations without limitation, unless otherwise noted. The use of "optionally" and related terms means that the subsequently described element, event, feature, or circumstance may or may not be present/occur, and that the description includes instances where said element, event, feature, or circumstance occurs and instances where it does not. The use of "exemplary" refers to "an example of" and is not intended to convey a meaning of an ideal or preferred embodiment. The use of "attached" and "coupled," and/or related terms, refers to the fixed, releasable, or integrated association of two or more elements and/or devices with or without one or more other elements in between. Thus, the term "attached" or "coupled" and related terms includes release-ably attaching or fixedly attaching two or more elements and/or devices in the present or absence of one or more other elements in between. As may be used herein, the terms "proximal" and "distal" are used to describe opposing axial ends of the particular elements or features being described in relation to placement. As may be used herein, the terms "proximal" and "distal," and any other relative position terms are intended to facilitate clarity regarding the disclosed embodiments, and do not limit the disclosure to any particular frame of reference.

While the systems, methods, and components described herein are exemplified by systems and methods for compliant force control, including rehabilitation equipment, the systems, methods, and components described and illustrated herein can be used in a wide variety of robotics implementations. Skilled artisans will be able to select a suitable implementation to utilize a system and/or method described herein according to a particular embodiment based on various considerations, including the type of force control and/or the structural arrangement.

The present disclosure provides systems, components and methods for providing a backdrivable actuator system with force control that is more streamlined and economical than conventional technologies. The systems and their components of the exemplary embodiments discussed include compliant force control modules which may be mated with linear actuators so as to achieve high backdrivability and the capability of force delivery conducive to patient rehabilitation, co-robot, and flight simulator applications. As will be understood by persons of skill in the art, 'backdrivability' is the ability of a system to provide interactive transmission of forces between an input and an output, so as to provide force feedback. The more backdrivable an actuator is, the easier it is to move an end effector thereof, and drive a transmission in reverse.

Figure 2:
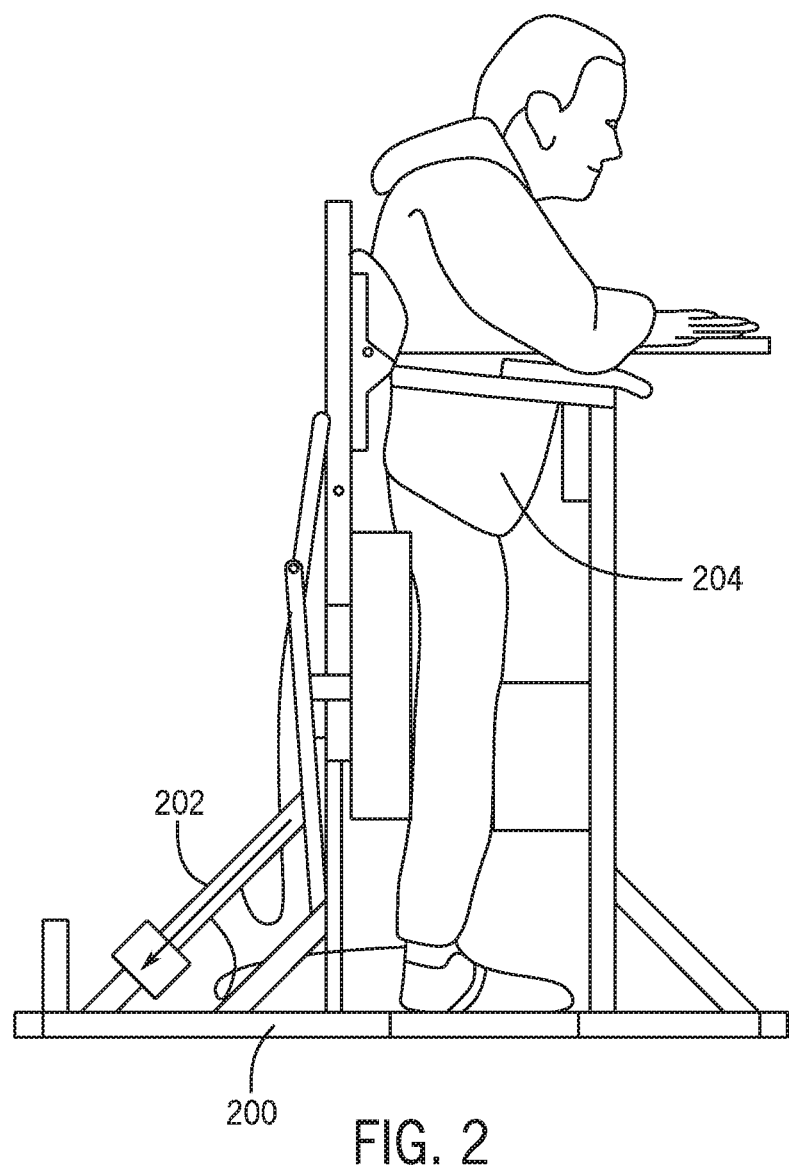
FIG. 2 is a side view of a rehabilitation system.

FIG. 2 is a side view of a rehabilitation system 200. The rehabilitation system 200 includes a frame in which a patient 204 is positioned, and an actuator 202. The rehabilitation system 200 is a "sit-to-stand" system in which the actuator 202 is used to help raise the patient 204 into a standing position. The actuator 202 is a rod-style linear actuator having an operating mode which does not allow for interactive patient therapy. The actuator 202 is not backdrivable. The "sit-to-stand" system 200 is a passive system in that it neither promotes nor allows the patient 204 to engage with the system 200 to transition from a sitting position to a standing position. Thus, the passive "sit-to-stand" system is not as conducive to rehabilitation as systems in which patients actively participate in the transition from sitting to standing or other movements.

Moreover, in typical rehabilitation implementations, the amount of force to be delivered is quite high (e.g., 200-500 lbs). For example, an actuator in rehabilitation equipment may need to deliver at least 300 lbs. and be capable of lifting the weight of patient 204. To date, existing "active" actuator systems capable of meeting these force needs, such as linear motors of a moving magnet or moving coil type, employ complicated structures and are prohibitively expensive for widespread use in physical medicine and rehabilitation equipment. Thus, in robotic rehabilitation, there is a need for robotic systems which physically interact with a patient's body with high backdrivability and the ability for force control (e.g., for partial unweighing). The systems according to various exemplary embodiments described below achieve a distributed control architecture with force sensing and control physically located in proximity to an actuator for a robust control system with lowered susceptibility to interference.

FIG. 1A is a side view of a system according to an embodiment. The system includes a compliant force control module 100 discussed in further detail below. The compliant force control module 100 includes a controller 20, a motor driver 30, and a force sensing system 40. A detail view of the force sensing system 40 of FIG. 1 is shown, for example, in FIGS. 3 and 6, among other figures. The system 100 further includes a motor 50, a housing 60 (as may also be referred to as a 'harness'), and an actuator 70. In the embodiment shown in FIG. 1A, the controller 20 is disposed atop the motor driver 30, which is in turn located above the force sensing system 40. The controller 20, motor driver 30 and force sensing system 40 are arranged so as to project from a first side of the housing 60 (e.g., so as to extend in a first axial direction). The motor 50 and actuator 70 are disposed on a second side of the housing 60 which is opposite to the first side.

Figure 1B:
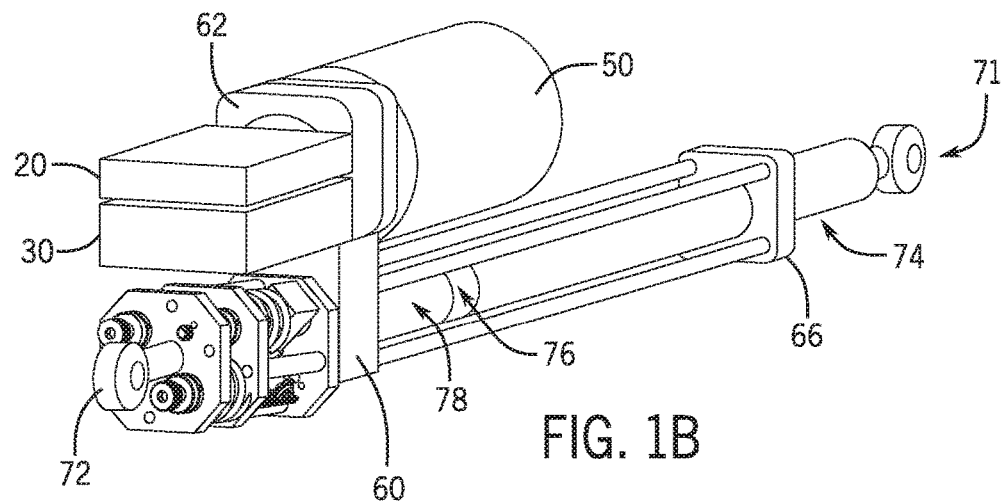
FIG. 1B is a front perspective view of the system shown in FIG. 1A.

FIG. 1B is a front perspective view of the system shown in FIG. 1A. As shown in FIG. 1B, the system further includes an upper housing portion 62 and a rear housing portion 66. The actuator 70 is a force-controlled linear actuator having a rod defined by a first rod end 71 located distally from the control module 100 and a second rod end 72 proximate to the control module 100. In some embodiments, the linear actuator is an electric cylinder type of actuator which is screw-driven.

Linear actuators such as the actuator 70 shown in FIGS. 1A-1B are typically considered to have low backdrivability, and thus are suitable for low-velocity applications, such as adjusting the tilt angle of solar panels. Such linear actuators have not been considered suitable for co-robots and rehabilitation robots. However, the electric cylinder type of actuators allow for high-velocity applications to be carried out. In some embodiments, the electric cylinder of the linear actuator allows for speeds of over 10 in/sec or more, or 0.25 m/sec or more to be achieved. Further, in addition to high velocity, the electric cylinder actuator is compact and achieves high power density (e.g., for delivery of continuous force of at least 300 lbs. according to at least one embodiment). A ball screw 78 and a ball nut 76 are provided with the rod of the actuator 70. The ball screw 78 is provided to convert rotation of the motor 50 into linear motion for driving.

Force Sensing

Figure 3:
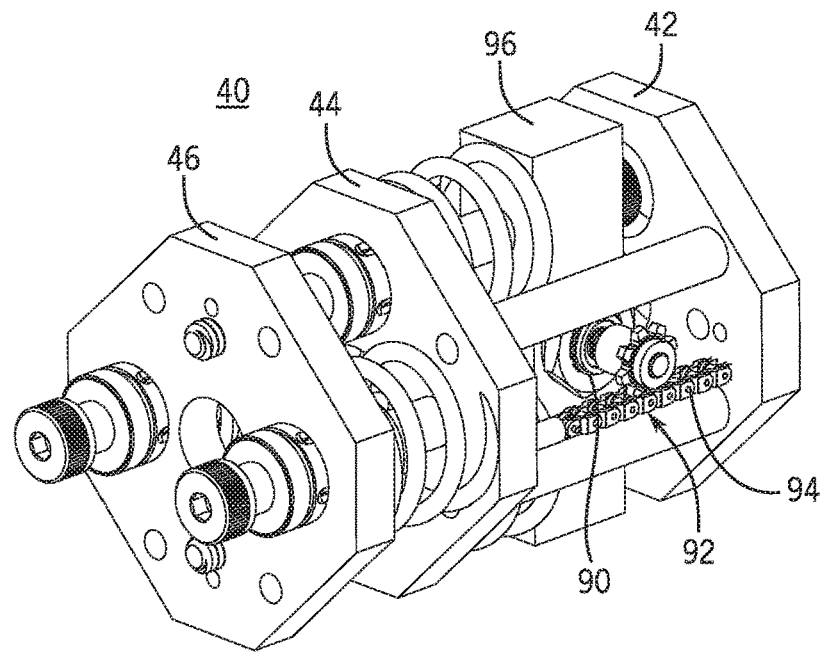
FIG. 3 is a front perspective view of a control module according to an embodiment.

FIG. 3 is a front perspective view of an embodiment including the compliant force control module 100. As shown in FIG. 3, the force sensing system 40 of the control module 100 includes at least three plates 42, 44, 46. The three plates shown in FIG. 3 are substantially identical in shape and configuration, allowing for a reduction in the number of unique parts required for manufacturing. In some embodiments, however, one or more of the plates may be different from one or more other plates.

Figure 7:
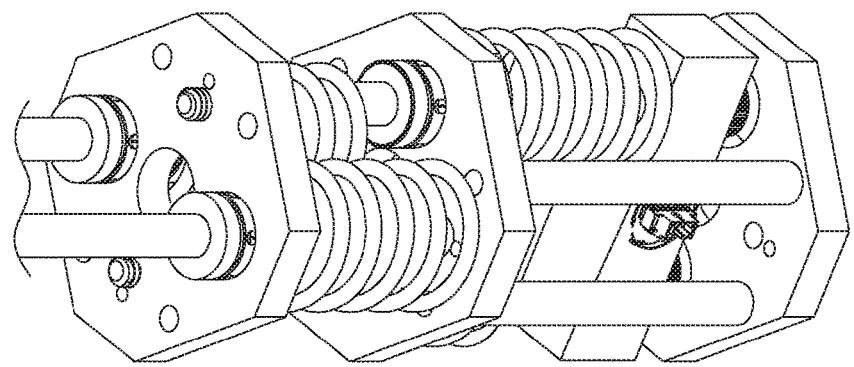
FIG. 7 is a depiction of a control module according to an embodiment.

In particular, the plates 42, 44, 46 of the control module 100 are placed at a distance from each other. For example, a first plate 46 is positioned at a first end of the control module 100, so as to be farther from the motor 50 shown in FIGS. 1A-1B. A third plate 42, on the other hand, is positioned on a second end of the control module 100, so as to be closer to the motor 50 than the first plate 46 is, while a second plate 44 is disposed between the first plate 46 and the third plate 42. In at least one embodiment, the second plate 44 is closer to the first plate 46 than to the third plate 42. In the embodiment shown in FIG. 3, each plate is configured as an octagon, although it will be appreciated that a wide variety of other configurations may be used. FIG. 7 shows a photograph of an example force sensing system 40. As seen in FIG. 7, the first plate 46 and third plate 42 are configured with a first group of central apertures of a first size, and a second group of apertures of a second size.

Referring again to FIG. 3, a plurality of components are provided between the first plate 46 and the second plate 44, and between the second plate 44 and the third plate 42. In particular, a plurality of guide elements (guide members) are provided to maintain substantial parallelism between the plates 42, 44, 46, as discussed below. Each of the plates 42, 44, 46 is substantially parallel (perfectly parallel or nearly perfectly parallel) to each of the other plates. In at least one embodiment, such parallelism is maintained for a range of forces acted on the control module 100. The arrangement of guide members and bearing members discussed below is configured to reduce the effects of mechanical play on alignment of system components. By maintaining substantial parallelism, twisting of the system due to torque carried by the ball screw 78 may be mitigated. Moreover, torques acting on other axes in the system may be reduced or cancelled, thereby lowering the risk of errors due to misalignment of a strip of encoder 90, discussed below.

Figure 4:
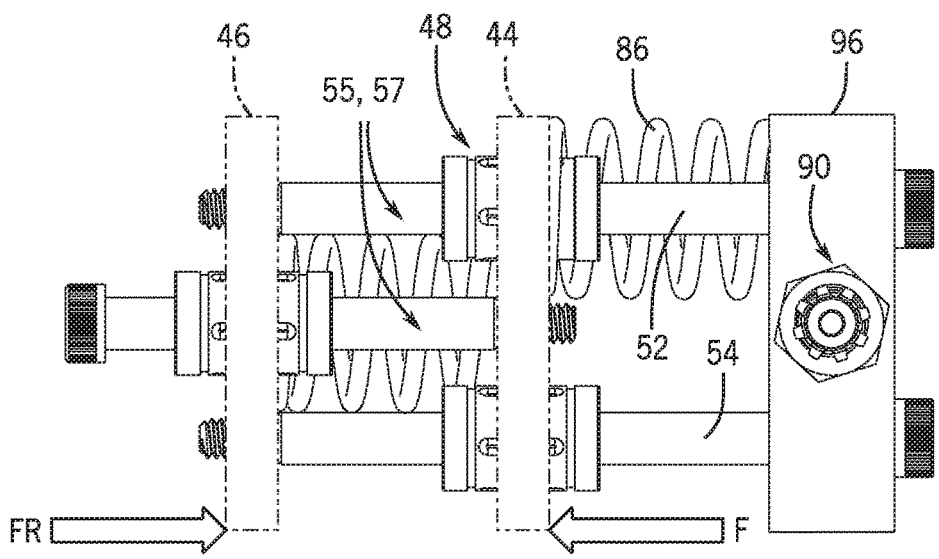
FIG. 4 is a partial side view of a control module according to an embodiment.

FIG. 4 is a partial side view of the force sensing system 40 of control module 100 according to an embodiment. For purposes of clarity, some elements shown in FIG. 3 are omitted in the partial view in FIG. 4. As described above, the force sensing system 40 includes a plurality of plates, including first plate 46 and second plate 44 disposed in parallel. The force sensing system 40 further includes a plurality of guides disposed between the first plate 46 and the second plate 44, including a first guide 55 cantilevered from the first plate 46 and a second guide 57 cantilevered from the second plate 44. The first guide 55 is offset in a vertical direction from the second guide 57 so as to be located above second guide 57. In some embodiments, at least one pair of guides is provided at a different height from a second pair of guides.

Figure 5:
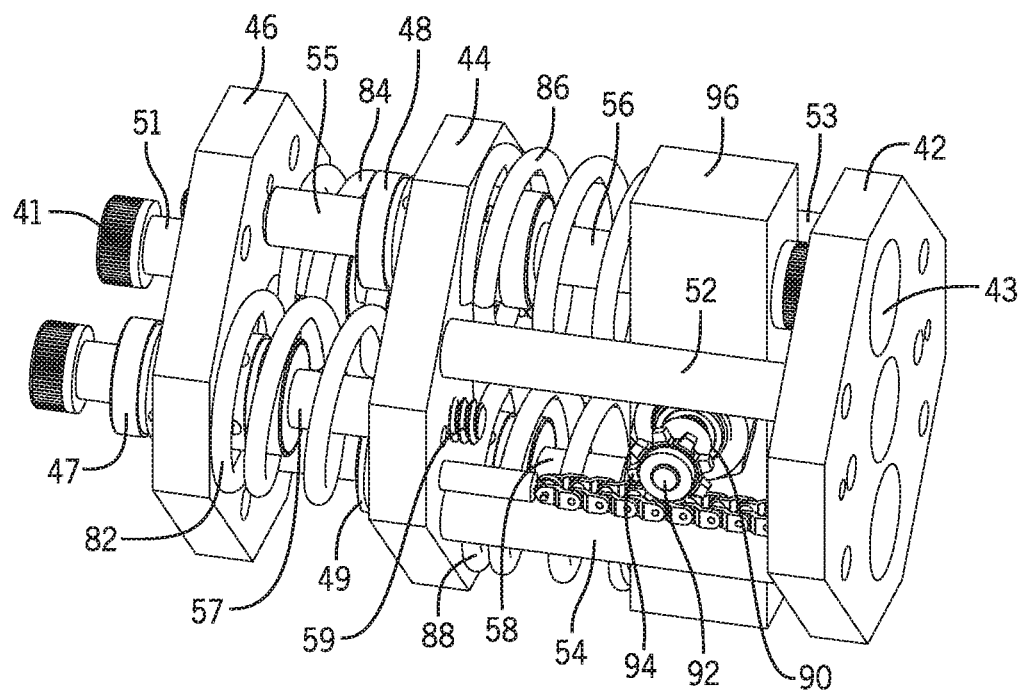
FIG. 5 is a rear perspective view of a control module according to an embodiment.
Figure 6:
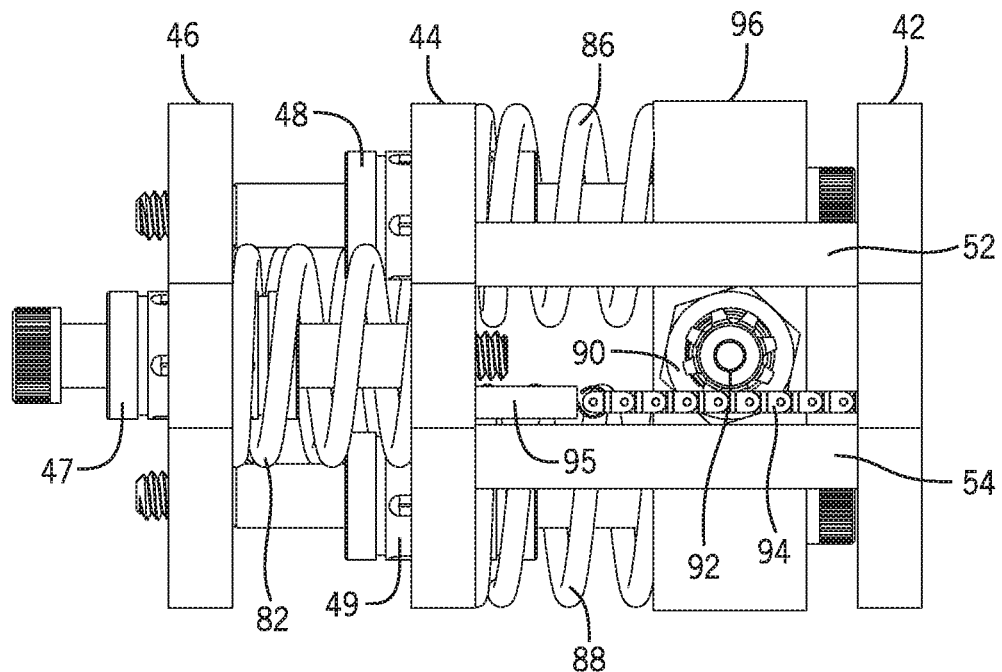
FIG. 6 is a partial side view of a control module according to an embodiment.

At least one embodiment includes at least one additional pair of guides, such as guides 52, 54 shown in FIG. 6. Each guide is configured so as to extend through or mate with apertures of a corresponding one of the plates 42, 44, 46. In some embodiments, a guide (such as guide 57 shown in FIG. 5) may be screwed into an aperture, such as an aperture of plate 44, and the guide 57 has a first end with a cap and a second end with a threaded screw portion 59.

Referring again to FIG. 4, the force sensing system 40 further includes a plurality of bearings including a first bearing 48 disposed at a distal end of the first guide 55, and a second bearing 47 disposed at a distal end of the second guide 57; the first guide 55 being arranged to mate with bearing 48, and the second guide 57 being arranged to mate with bearing 47. In some embodiments, the bearings 47 and 48, along with third bearing 49 configured to engage with guide 58, are dimensioned so as to extend through corresponding apertures in respective ones of the plates 42, 44, 46 where they are positioned.

In at least one embodiment, the plates 42, 44, 46 interlock with respective ones of the bearings 47, 48, 49 and linear guides, such as guides 52, 54, 55, 57, such that the plates are maintained in a nearly exactly parallel arrangement to one another. By virtue of this parallel arrangement, displacement of components such as elastic members discussed below is limited to axial displacement only, and components such as the elastic members and a displacement sensor are isolated from other translations and rotations, so as to resist moments and accurately measure an axial force.

In at least one embodiment, there is friction mitigation which is independent of the ability of the above-mentioned bearings to withstand bending moments exerted on parallel plates (i.e., bending moments which may generate an angle between the plates). Relatively low forces are generated in comparison to systems employing linear ball bearings with steel balls, where the bending moments may cause very high normal forces (of the bearing surface against linear sliding motion). In such systems, friction may be greatly increased when the bearing balls dig into the guides, damaging the surface of the guides and increasing resistance to motion. In some embodiments, the linear motion bearings which the linear guides ride in need not necessarily be ball bearings; rather, they may also be sleeve bearings (e.g., bushings), and the system may include a combination of bearings.

Figure 10A:
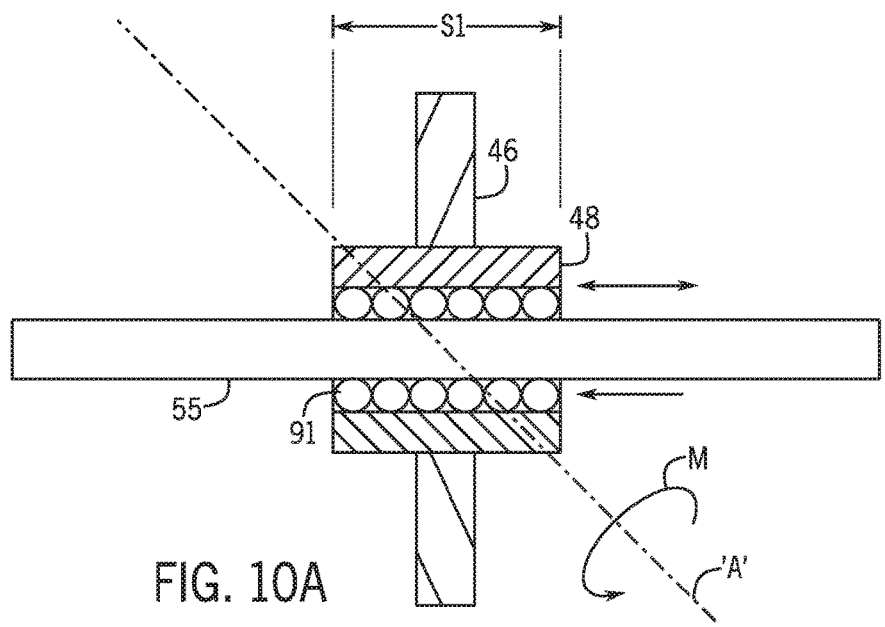
FIG. 10A illustrates a component arrangement according to an embodiment.
Figure 10B:
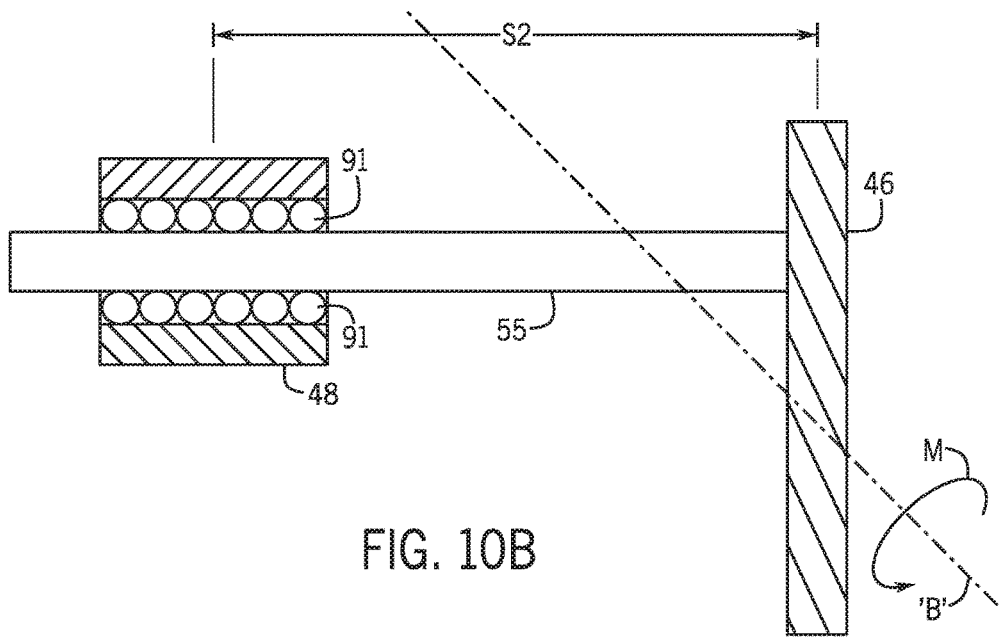
FIG. 10B illustrates a component arrangement according to an embodiment.

As shown in FIG. 10A, the arrangement of bearings (e.g., such as bearings 47, 48, 49 described above) assists in withstanding high forces. In particular, FIG. 10A shows a relationship between a bearing and a guide, such as the bearings 47, 48, 49 and the guides 52, 54, 55 for example. A linear bearing such as bearing 48 is provided in a plate (e.g., plate 46). At least one ball of bearing 48 is pressed into guide 55, such as balls 91. As shown in FIG. 10A, a spacing S1 is defined by a width of bearing 48, with the plate 46 being positioned in a center of bearing 48. A distance from a first end of bearing 48 to a second end of bearing 48 is larger than a distance from a first side of plate 46 to a second side of plate 46, such that in some embodiments, the distance between bearing sides may be 1.5-2.0 times the distance between plate sides, or more. The bearing 48 extends on either side of plate 46 and can move in an axial direction within a range. A moment M is applied onto the bearing 48 (on the plate 46 in which the bearing 48 is provided) around an axis labeled 'A'. The configuration shown in FIG. 10B is more able to resist such moments. In the arrangement shown in FIG. 10B, the balls 91 are pressed into guide 55, and bearing 48 is provided so as to be offset from the plate 46. The spacing S2 between the plate 46 and bearing 48 is larger than the arrangement shown in FIG. 10A. The moment M is applied around the axis labeled 'B,' at a distance from the bearing 48.

Figure 17A:
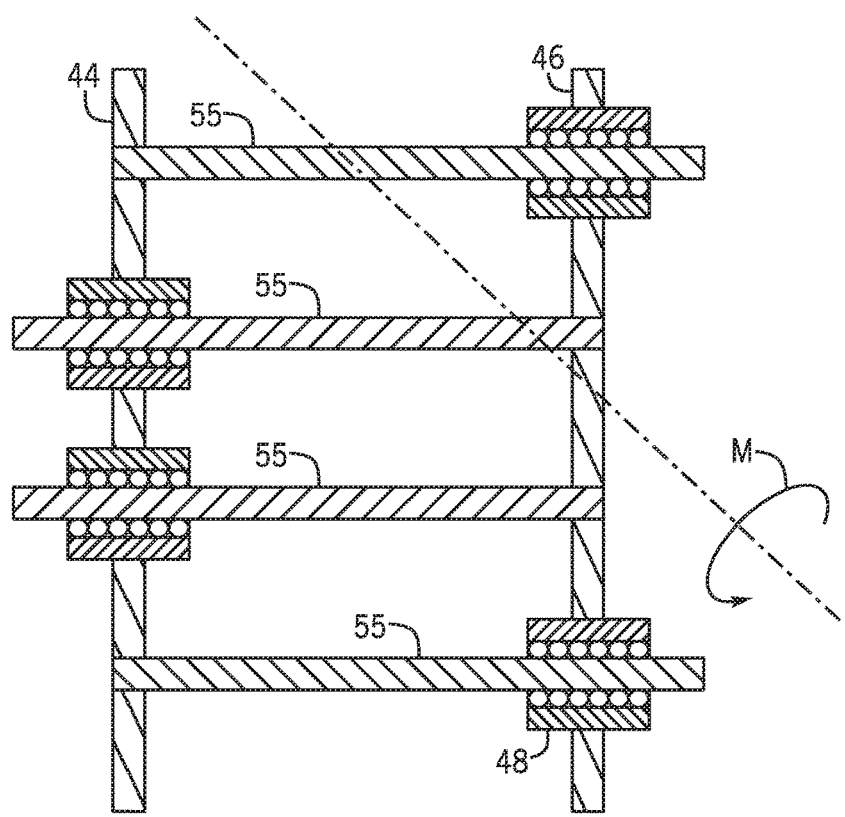
FIG. 17A illustrates a component arrangement according to an embodiment.
Figure 17B:
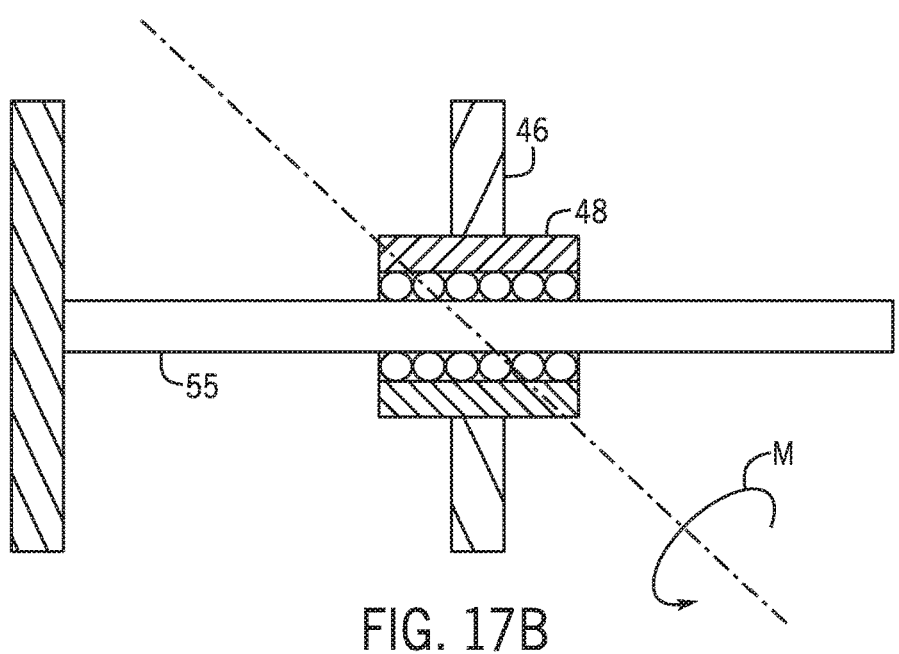
FIG. 17B illustrates a component arrangement according to an embodiment.

Further aspects of a component arrangement according to an embodiment are shown in FIGS. 17A-17B. In FIG. 17A, an assembly of interlocking guides and plates is shown, including a plurality of plates (e.g., plates 44, 46) and a plurality of guides, such as the guides 55 described above. The guides 55 are configured to communicate with bearings 48. With plate 44 held in place, and a moment applied onto plate 46, the rotation will be lessened or prevented because of the cantilevered guides which are press-fit into the plate 46 and guided by bearings 48 in plate 44, and vice-versa. Placing the bearing on the guide, as shown in FIG. 17B, results in lower resistance to moments.

Compliant Members

Turning now to FIGS. 4 and 5, the force sensing system 40 further includes a plurality of elastic members, including at least a first elastic member 82 disposed between the first plate 46 and the second plate 44, the first elastic member 82 being provided concentrically around the guide 55 and extending in an axial direction along the guide 55. A second elastic member 84 is provided so as to wrap around guide 51. A third elastic member 86 is wrapped around guide 56, while a fourth elastic member 88 is wrapped around guide 54. The elastic members may extend in a helical fashion around the respective guides. In at least one embodiment, the elastic members are arranged in series. More particularly, the elastic members 82, 84, 86, 88 are arranged in series between a motor 50 and gear train of the actuator 70 and the load which the actuator is intended to drive.

Each of the elastic members is configured to deflect in accordance with changes in distance between the two plates in which each elastic member is positioned. For example, first elastic member 82 deflects in accordance with a change in distance between the first plate 46 and the second plate 44, while third elastic member 86 deflects in accordance with a change in distance between second plate 44 and third plate 42. That is, the change in distance between the plates results in deflection of the elastic member between the plates. Various types of elastic members may be used. Such deflection, however, is only in an axial direction, as discussed further below.

In at least one embodiment, the plurality of elastic members comprises at least one spring selected from the group consisting of a linear spring, a non-linear spring, a viscoelastic spring, a coil spring, a flat spring and a machined spring. In some embodiments, a combination of one or more types of elastic members may be used (e.g., a volute spring, a leaf spring, etc.). While embodiments such as FIG. 6 show the elastic members disposed in a concentric or helical arrangement, with one or more elastic members at a different height from one or more other elastic members, a wide variety of other configurations may be used.

Further, in some embodiments, the elastic members may comprise a metal (such as steel), a polymer, or a combination thereof. In some embodiments, each elastic member is a viscoelastic compliant element or is provided together with an accompanying viscoelastic damping element. If the elastic members are limited to steel springs, mechanical vibrations in the control module 100 may be amplified, leading to instability. The stability of the actuator 70 may be kept in a predetermined safety margin by reducing the force gain exerted on the system; however, reducing the force gain in turn limits the benefit of employing force feedback in the closed loop force control scheme. By adding series damping in tandem with series elastic members, undesirable mechanical vibrations may be mitigated. Thus, it is preferred to use at least one viscoelastic element, to avoid reducing the performance of the actuator 70.

In at least one embodiment, elastic members such as the members 82, 84, 86, 88 shown in FIGS. 4-5 are subject to deflection only in an axial direction. The elastic members are subject to deflection only in the axial direction because the combination of the aforementioned plates, bearings and guides is effective to isolate loads on the elastic members. Regardless of any movements and transverse forces acting on the plate assembly, the deflection of the elastic members is effectively constrained. In particular, the deflection is constrained to be in the axial-only direction.

Thus, the elastic members are isolated from non-axial loads of the system, such that any moments and transverse forces on the plates will not result in a change of distance between the guides plate. Accordingly, the deflection of the elastic members can be measured to accurately provide a measurement of the amount of axial force exerted on the force sensing system 40. The deflection of the one or more elastic members is monitored with at least one displacement sensor (such as the encoder 90 discussed below), and with the monitored displacement information, the controller 20 may estimate the force magnitude and direction (e.g., using Hooke's law, F=k*x). By isolating the loads, the true axial deflection of the elastic members may be measured, while mitigating the effects of friction on displacement of the elastic members. It should be noted that frictional effects may be mitigated in the exemplary embodiments by virtue of the substantial parallelism achieved by the plates 42, 44, 46 and intermediate components such as the guides (e.g., guides 52, 54).

Further, as described above, the force sensing system 40 may be used to measure forces supplied by the actuator 70 and corresponding reaction forces. As indicated in FIG. 1A, a force F may be acted on the force sensing system 40 by the actuator 70 (e.g., in a direction from a first side where rod end 71 is located, to the force sensing system 40). In turn, a reaction force FR may be generated in the opposite direction (e.g., from a second side where rod end 72 is located, to the force sensing system 40). The forces may be measured and the measured values provided to the controller 20, discussed further below. In particular, the force sensing system is configured to measure at least a first force acting on a first plate 46 of the plurality of plates and a second force acting on a second plate 44 of the plurality of plates.

A system according to at least one embodiment described above is configured to output between 100-500 lbs. of force, and, in particular, at least 300 lbs. of force, so as to be conducive for typical physical therapy and rehabilitation applications. In some embodiments, the system is configured to output more than 500 lbs.

Encoder

As mentioned above, the force sensing system 40 includes an encoder 90 as shown in FIGS. 3-6, for example. The rotary encoder simply encodes changes in displacement into an electrical signal, to be read by the microcontroller or other electronic hardware where the control algorithm operates. The encoder 90 may be disposed in a block 96 positioned between second plate 44 and third plate 42. The block 96 may be machined from metal, polymer, or a combination thereof. In some embodiments, the block 96 is formed with at least one aperture through which at least one of the above-mentioned guides is configured to extend. For example, as shown in FIG. 4, guide 62 extends through an aperture in block 96 so as to project on either side of the block 96.

The encoder 90 is a rotary encoder which is configured to be communicated with a gear (sprocket) 92 that in turn is driven by a chain 94 such that the encoder 90 is rotated in accordance with relative motion of control module 100. The chain extends along at least a portion of guide 54 beneath encoder 90 and abuts against a projection 95 extending from a rear side of second plate 44.

The encoder 90 comprises a linear displacement sensor configured to measure the change in distance between the plates, e.g., between first plate 46 and second plate 44 and between the second plate 44 and a third plate 42. As the encoder 90 is assembled in the block 96 provided with the force sensing system 40, the encoder 90 comprises an integrated displacement sensor. The encoder 90 is configured to measure a position of each of the plurality of plates and to provide information of the measured position to the controller 20.

Motor and Motor Driver

Referring again to FIGS. 1A-1B, the motor 50 may be a brushless DC motor. The motor 50 is configured to be driven by motor driver 30. The motor driver 30 is configured to communicate with the controller 20, for example, to cause the motor to output a specified level of an output in accordance with an instruction issued by the controller 20.

Further, the motor 50 is configured to rotate and thereby generate a torque. The torque of the motor 50 is configured to be converted by the actuator 70 into an axial force. In particular, the actuator 70 converts the rotation of the motor 50 into linear motion.

As shown in FIGS. 1A-1B, the driver 30 and connector 30 are disposed atop the plurality of plates and are secured to housing 60. The controller 20 may be connected to the driver 30 by one or more connectors. In particular, the motor driver 30 is provided at a same end of the actuator 70 as the drive motor 50 and controller 20, thereby allowing for a simplified cable management scheme and reducing the risk of mechanical damage to cabling and susceptibility to noise and interference.

Controller

As mentioned above and as shown in FIGS. 1A-1B, for example, the control module 100 further includes a controller 20. In at least one embodiment, the controller 20 is a servo-driven microcontroller configured to be controlled by current. The controller 20 of at least one exemplary embodiment includes circuitry programmed to carry out real-time control of forces generated by control module 100. In particular, the controller 20 may be a microcontroller programmed to execute a closed loop torque control of the driver 30 of the motor 50 responsive to feedback from the force sensing system 40.

Further, the controller 20 is configured to receive at least one input from the force sensing system. Based on the at least one input, the controller 20 is configured to provide an instruction to the actuator 70. The actuator 70 is configured to exert a force against the force sensing system 40 in response to an instruction from the controller (e.g., a first force output in accordance with a first instruction, to be exerted on the plurality of plates 42, 44, 46). In this manner, in contrast to the actuator 202 shown in FIG. 2, the control module 100 allows for backdrivability of the system by providing feedback to the motor driver 30 of the motor 50 of actuator 70 in response to the change in distance measured by the encoder 90. The controller 20 is configured to execute a closed-loop force control algorithm to control the motor driver 30 responsive to the measuring of at least a first force and a second force described above (a force exerted on the force sensing system 40 and a corresponding reaction force, for example).

Figure 8:
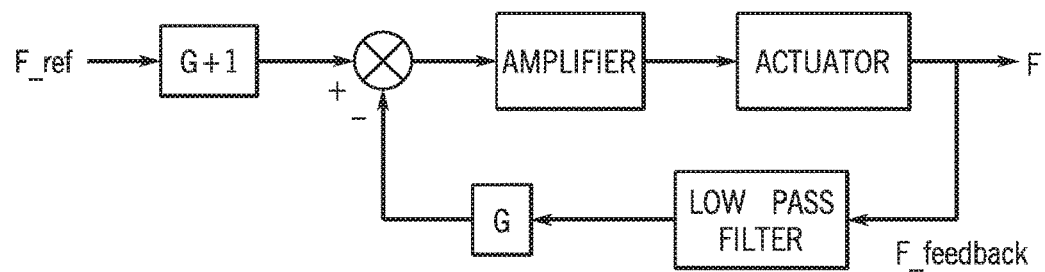
FIG. 8 is a block diagram showing a control circuit according to an embodiment.

FIG. 8 is a block diagram showing a control circuit as may be provided in controller 20, according to an embodiment. The controller 20 is programmed to operate a closed loop control algorithm, in real time, by receiving a force command, comparing the force command to force feedback, and generating a force command to be sent to the motor driver 30 to be executed. Specifically, the controller 20 may be programmed to carry out a closed-loop control function. The controller 20 is configured to provide an output such as an instruction by the controller 20 to the motor driver 30 to cause the motor 50 to generate a predetermined torque, in accordance with a reference force. The output is provided to an amplifier, which in turn is supplied to actuator 70 to generate the force in accordance with the instruction. The actuator 70 supplies a feedback signal to a low-pass filter. The low-pass filter outputs a gain, a value of which is provided to the controller 20. Based on the feedback, the subsequent instruction from the controller may be modified. In some embodiments, the low-pass filter may be omitted.

Figure 16:
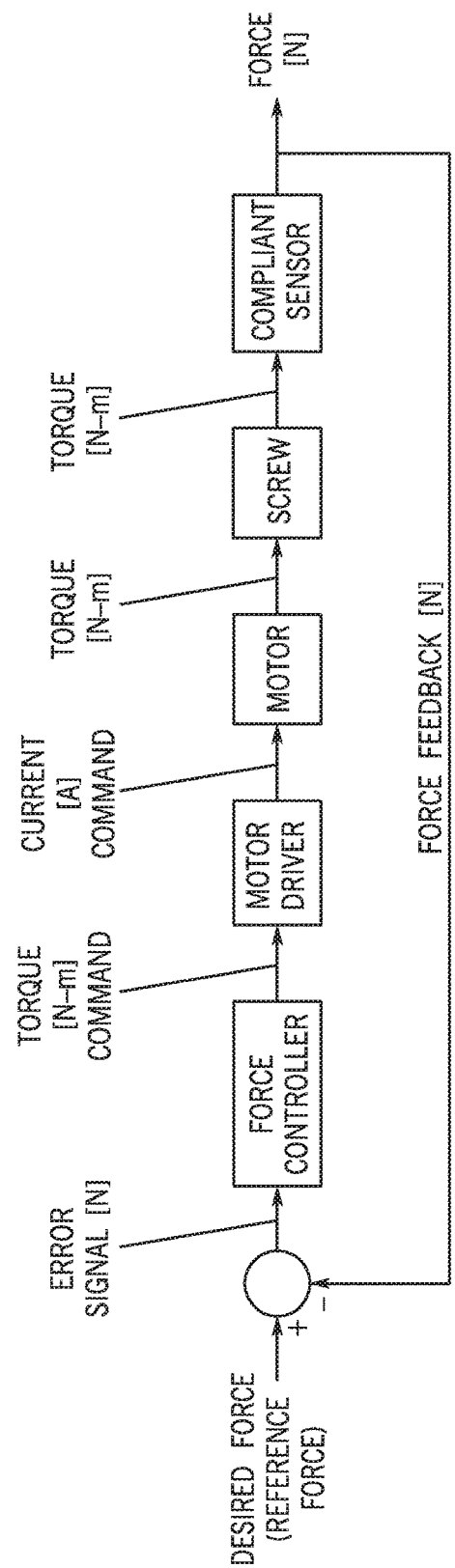
FIG. 16 is a block diagram showing a control circuit according to an embodiment.

FIG. 16 is another block diagram showing a control circuit as may be provided in controller 20, according to an embodiment. The force controller, motor driver and compliant sensor elements thereof may be mounted on the back of a linear actuator (such as linear actuator 70) which is already provided with a DC motor 50, so as to enhance force control. If the linear actuator is integrated with an existing motor and motor driver, then the force controller (implemented in a microcontroller) and compliant sensor may be provided, without the motor driver. The force controller element may be a proportional (P) or proportional and derivative (PD) controller, according to some embodiments. In other embodiments, other controllers may be employed. In the proportional controller implementation, a gain may multiply the error signal.

Figure 9:
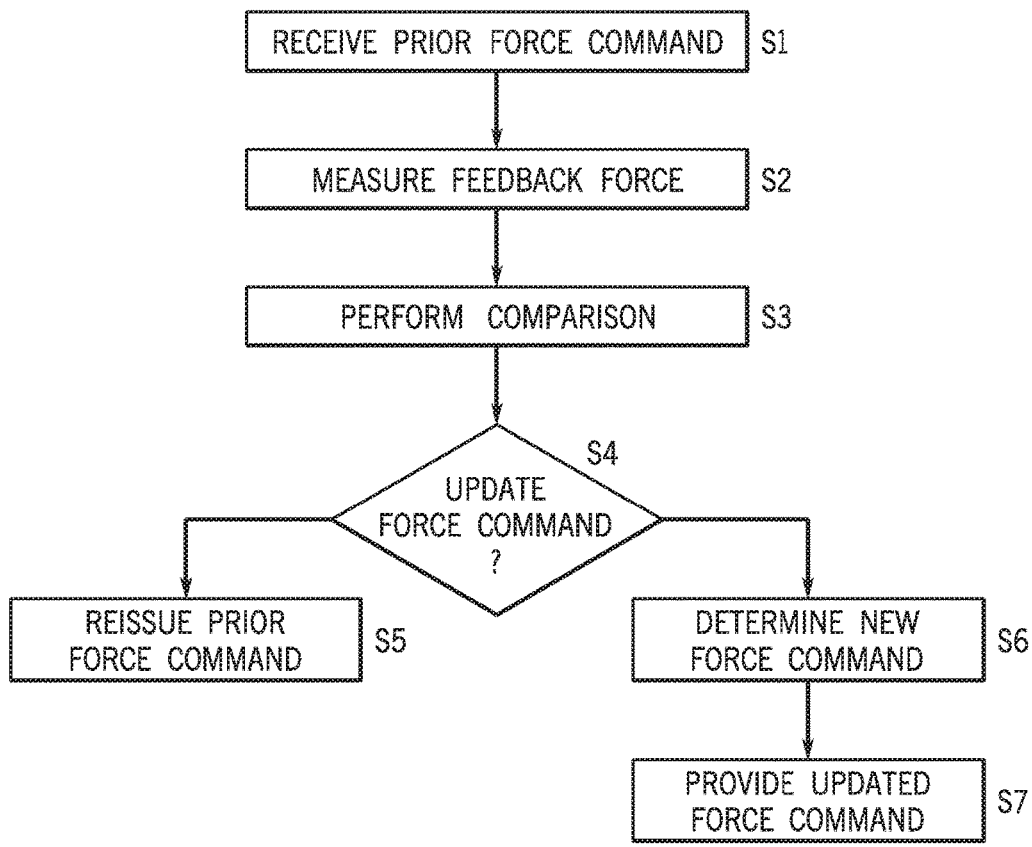
FIG. 9 is a flow diagram showing a process according to an embodiment.

FIG. 9 is a flow diagram showing a process 900 according to an embodiment, as may be executed by the controller 20. According to an embodiment, the controller 20 is configured to receive a prior force command at S1. The prior force command corresponds to a force instruction previously provided by the motor driver 30 to the motor 50. A first feedback force measurement is made based on data from the force sensing system 40 at S2. Following the feedback force measurement, a comparison is made to evaluate the prior force command and the feedback force measurement at S3. Based on the comparison, a determination is made at S4 of whether to update the force command, so as to change the amount of force which the motor driver 30 instructs the motor 50 to cause the actuator to deliver. When the controller determines that no change is needed, the controller 20 simply reissues the prior force command, at S5. On the other hand, when the controller 20 determines that a deviation between the prior force command and the feedback force response exceeds a predetermined threshold, for example, the controller may determine that a new force command should be issued, at S6. Once the controller determines that a new force command is needed, the revised force command is determined and provided to the motor driver 30 at S7.

Terms such as "controller," "computer," "microcomputer," "circuitry," "data processing system," "computing device," "module" or "component" encompass apparatus, devices, and machines capable of processing and storing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware such as a memory storing instructions executable by a processor, code that creates an execution environment for the computer program in question, e.g., code for processor firmware, a protocol stack, a data management system, an operating system, or a combination thereof. The controller 20 or components thereof can include or share one or more data processing apparatus, systems, computing devices, or processors.

A computer program (also known as a program, software, software application, script, or code) can be written in any form of program language and may be deployed in any form, including as a stand-alone program or as a module, component, subroutine, object, or other unit suitable for use in a computing environment. The controller 20 may be configured to execute one or more computer programs.

The processes and logic flows described herein may be performed by one or more programmable processors executing one or more computer programs (e.g., components of the controller 20) to perform actions by processing input data (such as measurements for linear displacement and force, or other measured or sensed data) and generating output (e.g., a force command). The processes and logic flows can also be performed by, and apparatus can also be implemented as, special purpose logic circuitry, e.g., one or more FPGAs or ASICs as described above.

In the embodiments described above, the plurality of series elastic members are isolated so as to deflect only in an axial direction, improving the accuracy of measurement. Moreover, by using a relatively low number of unique parts whose mechanical reliability has been experimentally confirmed, and by incorporating a commercially available, off-the-shelf electric cylinder, the resulting product line is both economical and of high mechanical reliability. Further still, by providing the controller 20 so as to have force control embedded therein, the control module 100 may be incorporated into a variety of existing systems without customization. In addition to the aforementioned embodiments, various other embodiments are also contemplated, as discussed below.

Actuator System Integration and Housing

In at least one embodiment, the control module 100, actuator 70, motor 50 and housing 60 may be integrated with a sit-to-stand device, such as the sit-to-stand device 200 shown in FIG. 2, in place of the actuator 206. The actuator 70 provided with the sit-to-stand device may supply at least 300 lbs. of force continuously and allow at least 10-30" of travel. In some embodiments, the actuator 70 may be configured as a self-contained actuator which is held by housing 60 and operates independently of a mechanism which it is driving. However, in at least one other embodiment, the actuator is not a self-contained actuator, and is instead one which depends on torsional rigidity of the mechanism which it is driving to provide a suitable reaction torque to constrain rotation of ball screw 78. Moreover, in some embodiments, a standalone control module 100 is provided with the controller 20 being pre-programmed to carry out force control as described above, and may be readily integrated with an existing system such as the sit-to-stand device 200.

Further, in at least one embodiment, types of actuators other than screw-driven electric cylinder linear actuators may be used, such as pneumatic cylinders, for example. Additionally, in at least one embodiment, one or more components of the actuator, housing and/or force sensing system may be ruggedized so as to be substantially waterproof and dustproof (e.g., to satisfy ingress protection standards set forth pursuant to IEC Standard 60529, Ed. 2.2, 2013) and configured to be operable at a wide range of temperatures and to withstand high vibrations.

FIGS. 11-16 show a control module in accordance with certain exemplary embodiments. As indicated above, the linear actuator 70 may be a substantially complete unit with bearings (e.g., such as bearings 47, 48, 49) that position the ball screw 78 both axially and radially. In the configuration shown in FIGS. 11-16, the ball screw 78 is integrated into the control module 100 by mating one end of the ball screw 78 via a bearing pair to one plate of the force sensing system of control module 100 (e.g., plate 46). This reduces weight and is beneficial for cost effectiveness and compactness of design. In the systems of FIGS. 11-16, spring deflection may be measured using a linear magnetic incremental encoder.

Further, the force sensing system of the embodiments shown in FIGS. 11-16 may include one or more different elements from the embodiments shown in FIGS. 3-6, for example. In particular, in the force sensing system 40 of FIGS. 3-6, a set of shoulder screws may be used to provide linear guiding and spring compression, so as to take axial loads. In the embodiments shown in FIGS. 11-16, the linear guides are hardened precision shafts, which have a constant cross-section. Thus, there is no 'head' to use for clamping the assembly together, so another set of components, such as tapped standoffs and screws, may be employed to keep the assembly together, with the springs pre-compressed. In some embodiments, the springs may be pre-compressed to between one quarter to one half of their expected maximum compression amount, or to more than one half of their expected maximum compression amount. As with the embodiments of FIGS. 3-6, the springs must be pre-compressed, so that when they deflect under external load, the springs are always in contact with the adjacent plates, as the middle plate moves with respect to the external plates.

Figure 11:
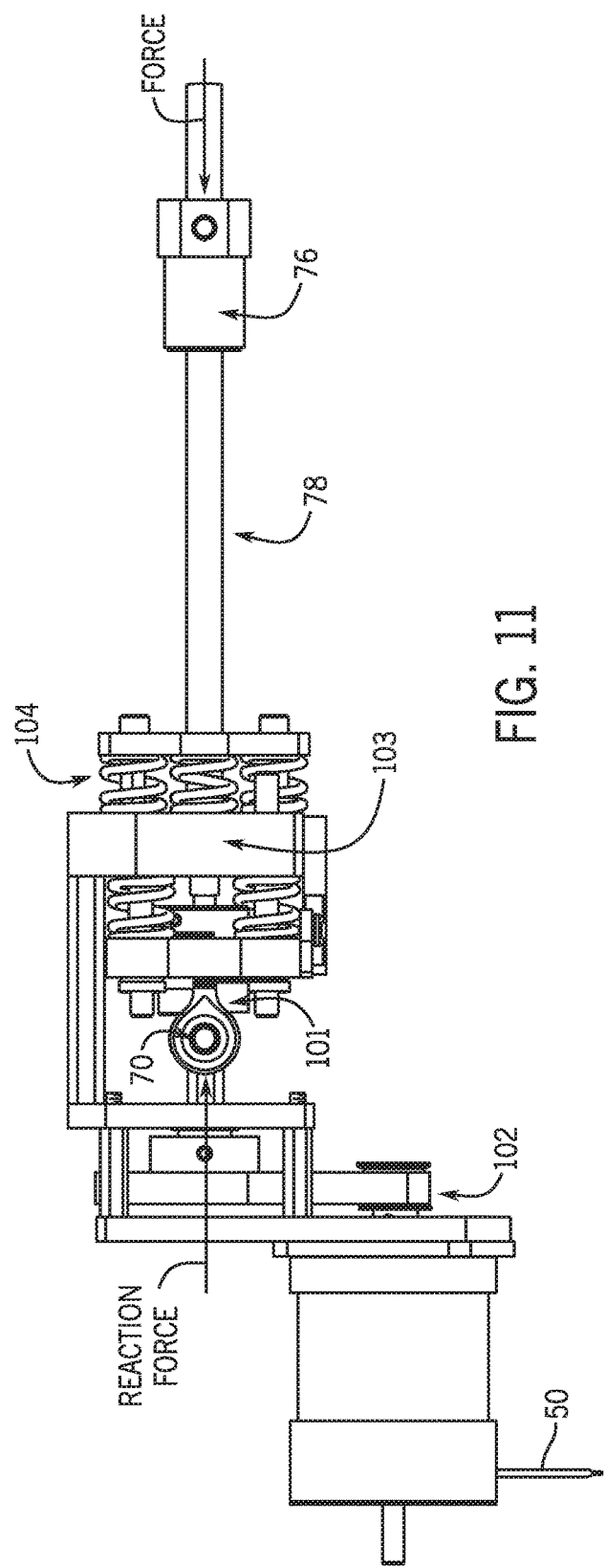
FIG. 11 is a side view of a control module according to an embodiment.
Figure 12:
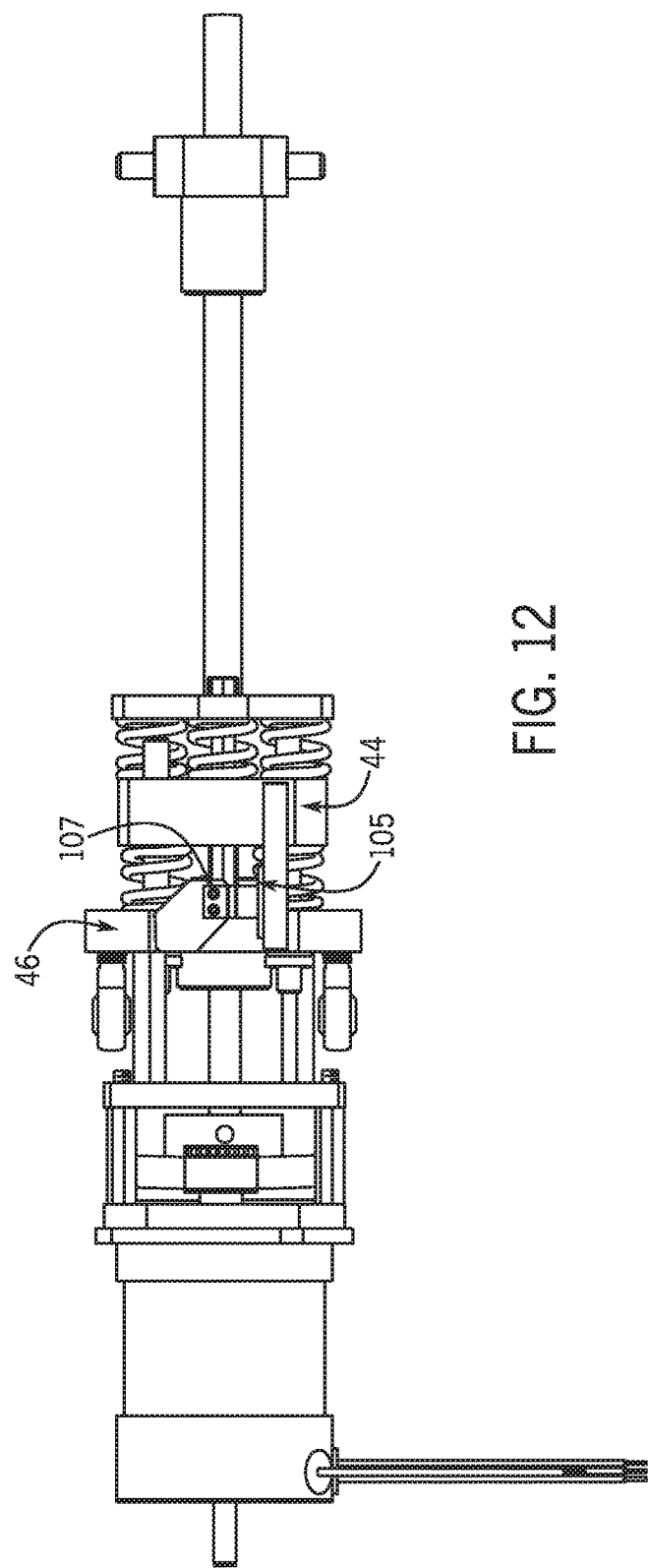
FIG. 12 is a side view of a control module according to an embodiment.
Figure 13:
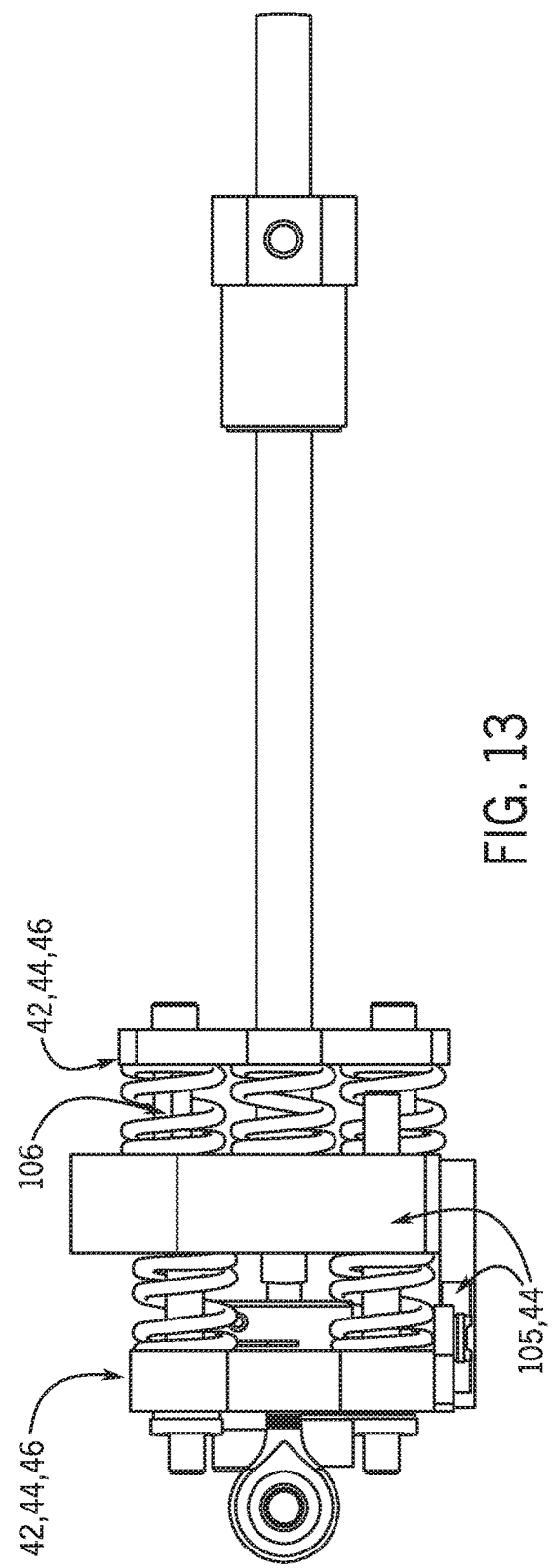
FIG. 13 is a side view of a control module according to an embodiment.
Figure 14:
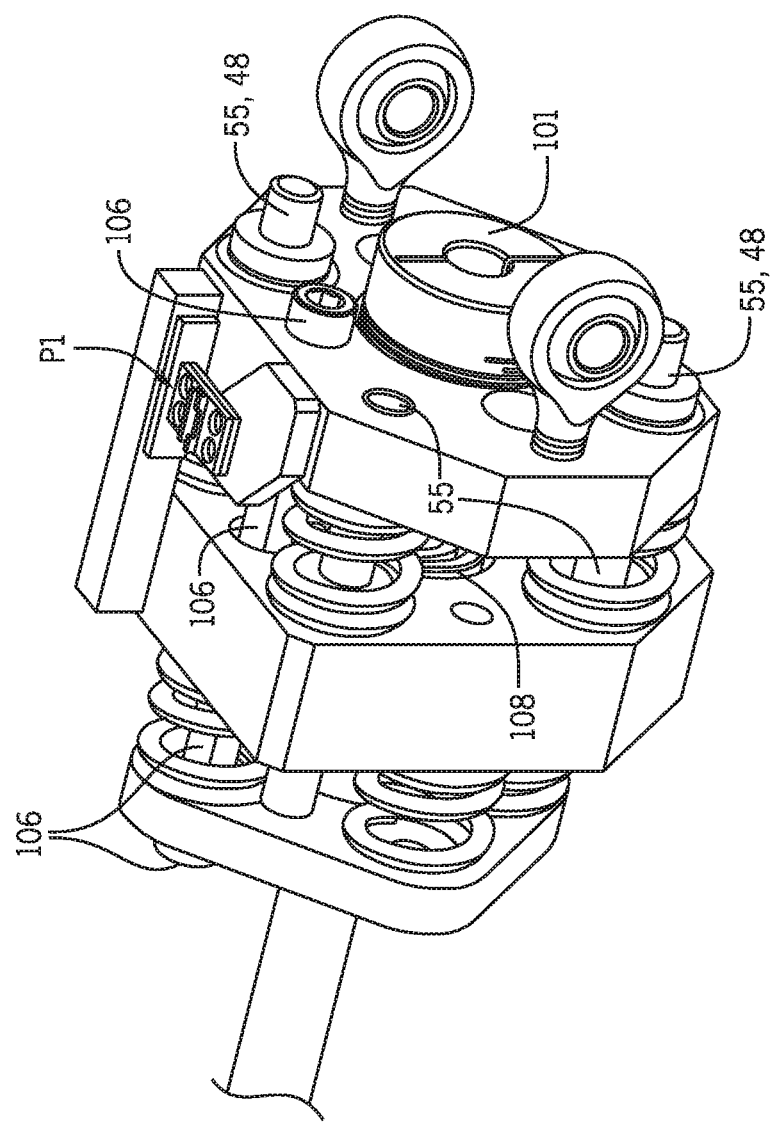
FIG. 14 is a perspective view of a control module according to an embodiment.
Figure 15:
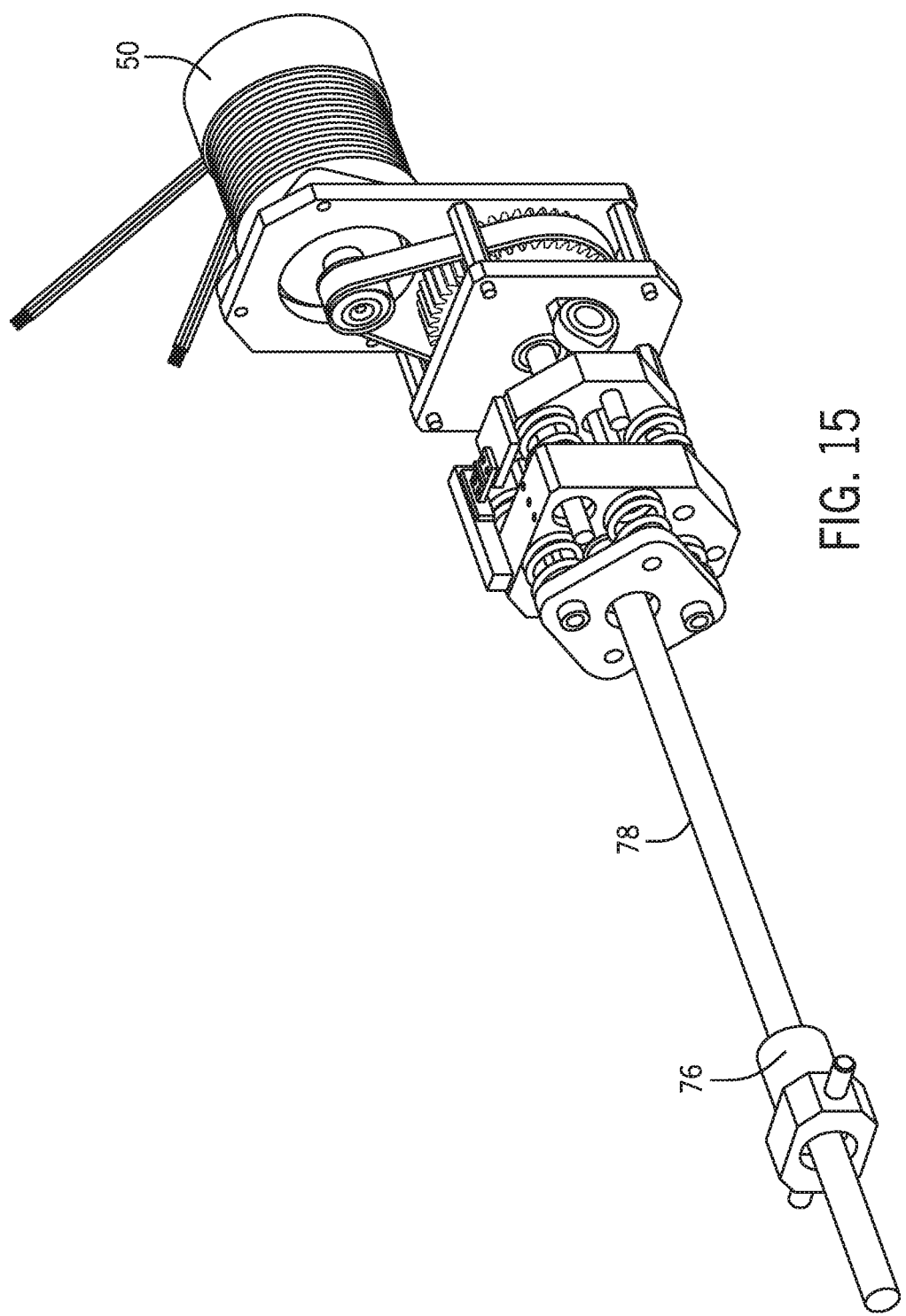
FIG. 15 is a perspective view of a control module according to an embodiment.

In particular, as shown in FIG. 11, an actuator 70 is mounted to a support structure of the force sensing system 40. A shaft coupler 101 is positioned between a timing belt transmission 102 and bearing 103 provided in a plate of a plate and guide assembly. As with the embodiments of FIGS. 3-6, the DC motor 50 is communicated with actuator 70. A plurality of springs 104 is provided with a plate and guide assembly. The springs are pre-compressed to half of a maximum compression amount, as described above. The plate and guide assembly is communicated with ball screw 78 and ball nut 76. As shown in FIG. 12, a magnetic incremental encoder strip 105 is attached to a plate 44, and a magnetic incremental encoder read head 107 is attached to a plate 46. As shown in FIG. 13, the encoder strip 105 is attached to plate 44 and disposed at a vertical offset from plates 42, 44, 46 which are fixed to one another. In the embodiment shown in FIG. 13, a tapped standoff 106 keeps outer plates (e.g., 42, 46) bolted together, thereby compressing the springs 104 to at least half of an allowable compression level. As shown in FIG. 14, the standoff 106 may be a threaded component which holds the assembly together with screws so as to pre-compress each of the plurality of springs 104. Linear guides (such as guides 55 described above) are configured to ride in linear bearings such as the bearings 103. In some embodiments, the linear motion bearings may be ball bearings, sleeve bearings (e.g., bushings), or any combination thereof.

In some embodiments, the linear guides may be press-fitted into plates (e.g., plates 42, 44, 46). A flexible shaft coupler (such as the coupler 101) transmits power from motor 50 to ball screw 78. Further, an angular contact bearing pair 108 is configured to receive radial and axial loads in the ball screw. The relative motion of the system may be measured at a plurality of locations including location P1. Another perspective view of the configuration shown in FIG. 14 is provided in FIG. 15, from a rear side.

In view of the illustrative embodiments described above, it should be apparent that the foregoing is illustrative and not limiting, having been presented by way of example. In particular, acts, elements and features discussed in connection with one embodiment are not intended to be excluded from a similar role in other embodiments.

The phraseology and terminology used herein are for the purposes of description and should not be regarded as limiting. Any use of terms such as "including," "comprising," "having," "containing," "involving," "characterized by," "characterized in that" and variations thereof herein, is meant to encompass the items listed thereafter, equivalents thereof, and additional items, as well as alternate embodiments consisting of the items listed thereafter exclusively. In at least one embodiment, the systems and methods described herein consist of one, each combination of more than one, or all of the described elements, acts, or components.

Any references to embodiments, elements or acts of the systems and methods herein referred to in the singular may also embrace embodiments including a plurality of such elements, and any references in plural to any embodiment or element or act herein may also embrace embodiments including only a single element. References in the singular or plural form are not intended to limit the presently disclosed systems or methods, their components, acts, or elements to single or plural configurations. References to any act or element being based on any information, act or element may include embodiments where the act or element is based at least in part on any information, act, or element.

As many modifications, variations and changes in detail can be made to the described embodiments, it is intended that all matters in the foregoing description and shown in the accompanying drawings be interpreted as illustrative and not in a limiting sense. Thus, the scope of the invention should be determined by the appended claims and their legal equivalents.

The invention claimed is:

1. A system comprising:
   a plurality of plates disposed in parallel;
   at least a first elastic member disposed between a first plate and a second plate of the plurality of plates;
   a position sensor configured to measure a change in distance between at least the first plate of the plurality of plates and the second plate of the plurality of plates;
   a driver for a brushless motor driving an actuator communicated with the first plate and the second plate; and
   a microcontroller programmed to execute a closed loop torque control of the motor responsive to feedback from the position sensor.

2. The system of claim 1, wherein:
   the first elastic member is one of a plurality of elastic members, and
   the first elastic member disposed between the first and second plates is subject to deflection only in the axial direction of the first elastic member.

3. The system of claim 1, further comprising:
   a plurality of linear guides disposed between at least two plates of the plurality of plates, the plurality of linear guides including
      a first guide attached to the first plate of the plurality of plates so as to be cantilevered from the first plate; and
      a second guide attached to the second plate of the plurality of plates so as to be cantilevered from the second plate; and
   a plurality of linear bearings respectively disposed at distal ends of the plurality of guides, the plurality of bearings including
      a first bearing disposed at a distal end of the first guide, and a second bearing at a distal end of the second guide;
      the first guide being engaged with the second bearing and the second guide being engaged with the first bearing.

4. The system of claim 1, wherein:
   the actuator is a linear actuator configured to exert, through motion of the linear actuator, a force against the plurality of plates in response to an instruction from the microcontroller.

5. The system of claim 1, wherein:
   the first elastic member disposed between the first and second plates is subject to deflection only in an axial direction.

6. The system of claim 1, wherein the actuator is a linear actuator.

7. The system of claim 1, wherein the position sensor is a linear encoder configured to measure deflection of at least the first elastic member, and the linear encoder is a magnetic encoder.

8. A method, comprising:
   disposing a plurality of plates in parallel, including a first plate and a second plate, wherein at least a first elastic member is disposed between the first plate and the second plate;
   attaching a first guide to the first plate to be cantilevered from the first plate;
   attaching a second guide to the second plate to be cantilevered from the second plate;
   disposing a first bearing at a distal end of the first guide, and a second bearing at a distal end of the second guide;
   engaging the first guide with the second bearing and the second guide with the first bearing;
   measuring, by a sensor, a change in distance between the first plate and the second plate; and
   providing feedback to a controller of a motor driver to drive a motor in response to the change in distance measured by the sensor.

9. The method of claim 8, further comprising:
   communicating the actuator with at least one plate of the plurality of plates; and
   driving the actuator via the motor controlled by the motor driver;

wherein the actuator is a linear actuator comprising a ball screw and a ball nut.

10. The method of claim 8, further comprising:
controlling, by the controller, the motor driver responsive to the measuring of the change in distance between the first plate and the second plate, the controller being positioned proximate to the motor.

11. The method of claim 9, wherein the sensor is a linear encoder provided between two plates of the plurality of plates and configured to measure the change in distance between the first plate and the second plate.

12. The method of claim 11, wherein the linear encoder is a magnetic encoder.

* * * * *